United States Patent
Lin et al.

(10) Patent No.: US 7,952,894 B2
(45) Date of Patent: May 31, 2011

(54) SYNCHRONOUS RECTIFIER CONTROL DEVICE AND A FORWARD SYNCHRONOUS RECTIFIER CIRCUIT

(75) Inventors: Chun-Ming Lin, Hsinchu (TW); Ta-Ching Hsu, Sijhih (TW); Yun-Kang Chu, Hsinchu (TW)

(73) Assignee: Niko Semiconductor Co., Ltd., Taipei (TW)

( * ) Notice: Subject to any disclaimer, the term of this patent is extended or adjusted under 35 U.S.C. 154(b) by 541 days.

(21) Appl. No.: 12/155,353

(22) Filed: Jun. 3, 2008

(65) Prior Publication Data

US 2009/0168464 A1    Jul. 2, 2009

(30) Foreign Application Priority Data

Dec. 31, 2007   (TW) ............................... 96151532 A

(51) Int. Cl.
   *H02M 3/335*   (2006.01)
   *H02M 7/217*   (2006.01)
(52) U.S. Cl. .................. 363/21.06; 363/127; 363/89
(58) Field of Classification Search ............... 363/21.06, 363/21.07, 127, 89
   See application file for complete search history.

(56) References Cited

U.S. PATENT DOCUMENTS

| 6,418,039 B2 * | 7/2002 | Lentini et al. | 363/21.06 |
| 7,773,398 B2 * | 8/2010 | Kyono | 363/127 |

* cited by examiner

*Primary Examiner* — Shawn Riley
(74) *Attorney, Agent, or Firm* — Rosenberg, Klein & Lee

(57) ABSTRACT

A synchronous rectifier control device comprises a status detecting unit, an analog circuit, a first counter, a second counter and a signal process unit. The status detecting unit receives at least one reference signal and a detecting signal to generate a first synchronous control signal. The analog circuit generates a delay signal in accordance with the first synchronous control signal. The first counter receives a clock signal and generates a first counter signal in accordance with the first synchronous control signal, the clock signal, and the delay signal. The second counter receives the clock signal and generates a second counter signal in accordance with the first synchronous control signal, the clock signal, and the first counter signal. The signal process unit generates a second synchronous control signal in accordance with the first synchronous control signal and the second signal.

10 Claims, 6 Drawing Sheets

SYNCHRONOUS RECTIFIER CONTROL DEVICE AND A FORWARD SYNCHRONOUS RECTIFIER CIRCUIT

BACKGROUND OF THE INVENTION

1. Field of the Invention

The present invention relates to a forward synchronous rectifier control device and a forward synchronous rectifier circuit; in particular, to a forward synchronous rectifier control device and a forward synchronous rectifier circuit in which deadtime may be set by using an analog circuit.

2. Description of Related Art

FIG. 1 illustrates a diagram of a conventional forward coverter. The forward converter is provided with a transformer T1, and a primary side of the transformer T1 has an input voltage VIN is provided by a pre-stage circuit, a pulse width modulation controller PWM, an input filtering capacitor C1, an start-up resistor R1, an start-up capacitor C2, a current detecting resistor R2, rectifier diode D1 and a transistor switch Q1 controlled by pulse width modulation controller PWM. On the secondary side of transformer T1 has two output rectifier diodes D2, D3, an energy storage inductor L, an output filtering capacitor C3 and a voltage detector 10 consists of resistors R3 and R4.

In the above-mentioned forward converter, when initially started, an input voltage VIN begins to charge start-up capacitor C2 through start-up resistor R1. When the voltage potential in start-up capacitor C2 has been charged to a level enough for initiating pulse width modulation controller PWM, pulse width modulation controller PWM will start to operate. Pulse width modulation controller PWM adjusts a duty cycle of a control signal in accordance with a voltage detecting signal of output voltage VO from voltage detector 10 and the a current detecting signal for the input current from current detecting resistor R2, so as to tune the ratio of conducting and cutoff times in transistor switch Q1. When output voltage VO is below a predetermined voltage, the conducting time ratio in transistor switch Q1 will be increased; contrarily, when output voltage VO is above the predetermined voltage, the conducting time ratio in transistor switch Q1 will be reduced, thereby a stable output voltage VO can be outputted When transistor switch Q1 is turned on, input voltage VIN provides power through transformer T1, stores power to start-up capacitor C2 through rectifier diode D1, and stores power to energy storage inductor L and output filtering capacitor C3 through rectifier diode D2. When transistor switch Q1 is turned off, start-up capacitor C2 releases power to provide pulse width modulation controller PWM for operation continously, while energy storage inductor L releases power to output filtering capacitor C3 via rectifier diode D3.

However, since there are forward voltage drop on rectifier diodes D2, D3 when current flows through, power loss thus appears. As a result, it is known, in prior art, that the rectifier diodes may be replaced with transistor switches, so as to reduce power loss therein.

Referring now to FIG. 2, wherein a diagram of a conventional forward synchronous rectifier circuit is shown, in which transistor switches Q2, Q3 are used to replace rectifier diodes D2, D3 in FIG. 1. A synchronous rectifier controller Con controls the conducting and cutoff times of transistor switches Q2, Q3 based on the secondary side voltage of transformer T1.

FIG. 3 illustrates a signal timing diagram of a conventional forward synchronous rectifier circuit. In conjunction with FIGS. 2 and 3 for references, the secondary side voltage of transformer T1 is VD, and synchronous rectifier controller Con detects voltage VD of transformer T1 and generates a reference signal S. Synchronous rectifier controller Con provides a clock signal, and based on this clock signal counts the number of times voltage went positive or negative for the secondary side voltage VD. As shown in FIG. 3, in the first period, there are respectively n11 and n21 time periods, and in the second period, there are respectively n12 and n22 time periods, etc. Synchronous rectifier controller Con is also predetermined with two deadtime parameters x1 and x2 to be deducted from the above-mentioned counts, used as the time periods of conducting signal for transistor switch Q2 and transistor switch Q3 in the next period. For example, when the time period counts reaches n11 and n21 in the first period, then in the second period, the conducting time period of transistor switch Q2 is (n11−x1) clock signals length, and the conducting time period of transistor switch Q3 is (n21−x2) clock signals length. When the time period counts reaches n12 and n22 in the second period, then in the third period, the conducting time period of transistor switch Q2 is (n12−x1) clock signals length, and the conducting time period of transistor switch Q3 is (n22−x2) clock signals length, and so forth. Hence, it is possible to set the deadtime period multiplied by one clock signal length between transistor switch Q2 cutoff and transistor switch Q3 conducting, and set the deadtime period multiplied by two clock signal length between transistor switch Q3 cutoff and transistor switch Q2 conducting, so as to avoid any probable damages caused by simultaneous conductance at transistor switches Q2 and Q3.

However, the aforementioned deadtime period setting is to use the fixed time period provided by the clock signal, and the length of deadtime period set thereby is thus also fixed. For different applications, the switching frequency of pulse width modulation controller PWM on the primary side of the forward synchronous rectifier circuit does vary, and the appropriate deadtime length thereof necessarily changes. Therefore, the application range of the above-mentioned synchronous rectifier controller is restricted.

SUMMARY OF THE INVENTION

In view of the disadvantage that the deadtime period setting of the forward synchronous rectifier circuit is unable to be appropriately adjusted in accordance with application environment, the synchronous rectifier control device of the present invention can adjust the length of the deadtime times based on specified conditions, thus it is possible to satisfy various needs and provides a wider range of applications.

To achieve the above-mentioned objective, the present invention provides a synchronous rectifier control device, coupled with a secondary side of a forward synchronous rectifier circuit. The said synchronous rectifier control device includes a status detecting unit, an analog circuit, a first counter, a second counter and a signal processing unit. The condition detecting unit receives a detecting signal representing the condition on the secondary side of the forward synchronous rectifier circuit and at least one reference signal, in which a first synchronous control signal is generated accordingly. The analog circuit is coupled with the condition detecting unit, and generates a delay signal based on the first synchronous control signal. The first counter is coupled with the condition detecting unit and the analog circuit, and receives a clock signal. The first counter generates a first counting signal according to the first synchronous control signal, the clock signal and the delay signal. The second counter is coupled with the first counter and the condition detecting unit, and receives the clock signal. The second counter generates a second counting signal according to the first synchronous control signal, the clock signal and the first counting signal. The signal processing unit is coupled with the condition detecting unit and the second counter, so as to generate a second synchronous control signal based on the first synchronous control signal, and the second counting signal.

The present invention also provides a forward synchronous rectifier circuit, which includes a converting unit, a first switch, a pulse width modulation controller, a synchronous rectifier switch unit and a synchronous rectifier control device. The converting unit has a primary side and a secondary side, in which the primary side is coupled with an input voltage for converting the power of the input voltage into an output voltage onto the secondary side. The first switch is coupled with the primary side of the converting unit. The pulse width modulation controller controls the switching of the first switch based on a detecting signal of the output voltage. The synchronous rectifier switch unit has a second switch and a third switch, coupled with the secondary side of the converting unit to rectify the output voltage. The synchronous rectifier control device couples with the secondary side of the converting unit, and generates a first synchronous control signal and a second synchronous control signal based on the condition of the secondary side, so as to respectively control the switching of the second switch and the third switch, wherein the synchronous rectifier control device is coupled with a resistor or a capacitor, sets a time lag between the first synchronous control signal and the second synchronous control signal based on the capacitance value or resistance value.

DETAILED DESCRIPTION OF THE PREFERRED EMBODIMENTS

The present invention employs a simple analog to set a delay time, such that there exists a deadtime period between conducting periods of the rectifier transistor switches on the secondary side of a forward synchronous rectifier device. The above-mentioned analog circuit can adjust the length of the delay time by using the adjustment of capacitance value or resistance value, so as to fulfill different needs found in various application environment, and provide wider range of application flexibility.

Figure 1:
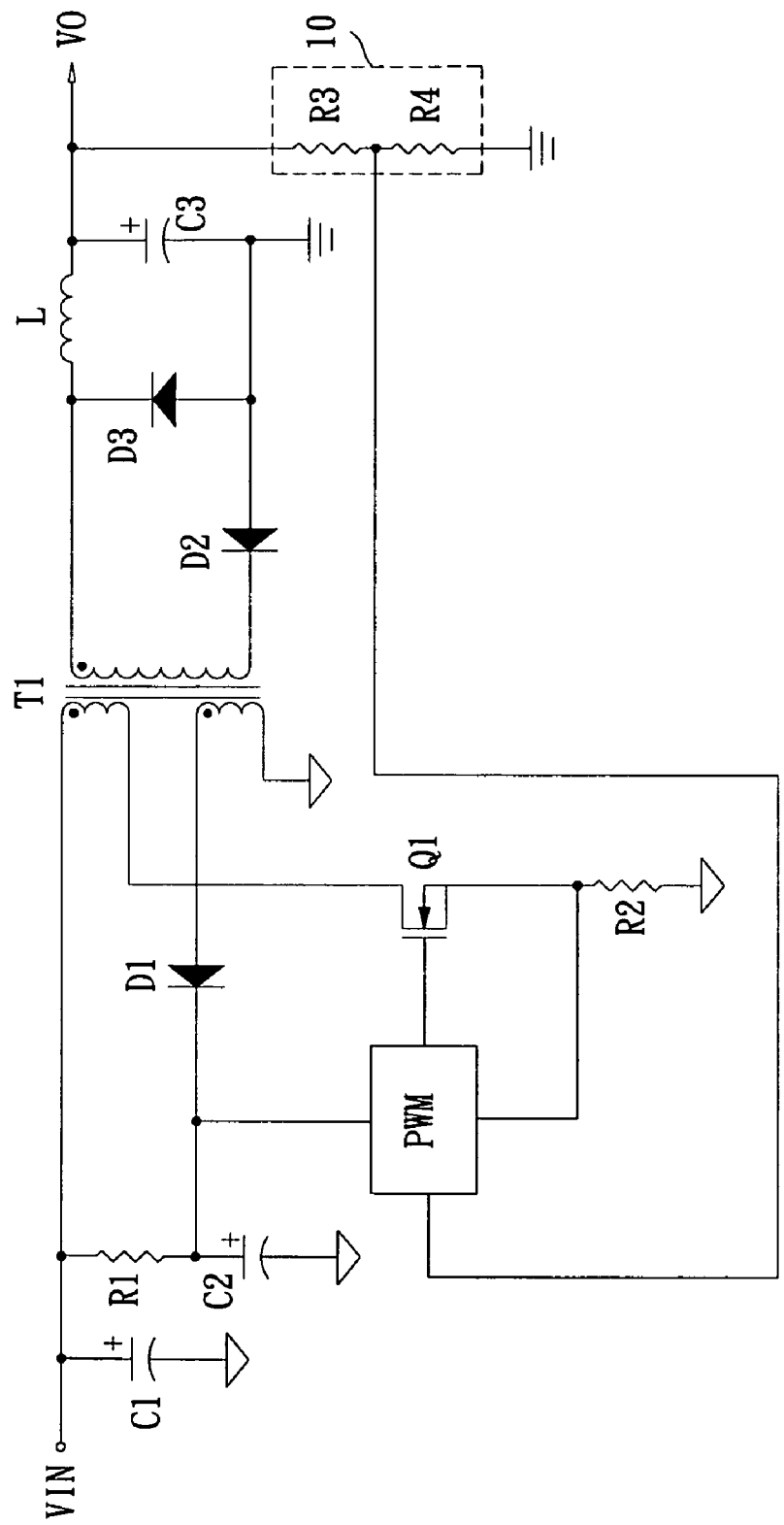
FIG. 1 shows a diagram of a conventional forward circuit.
Figure 2:
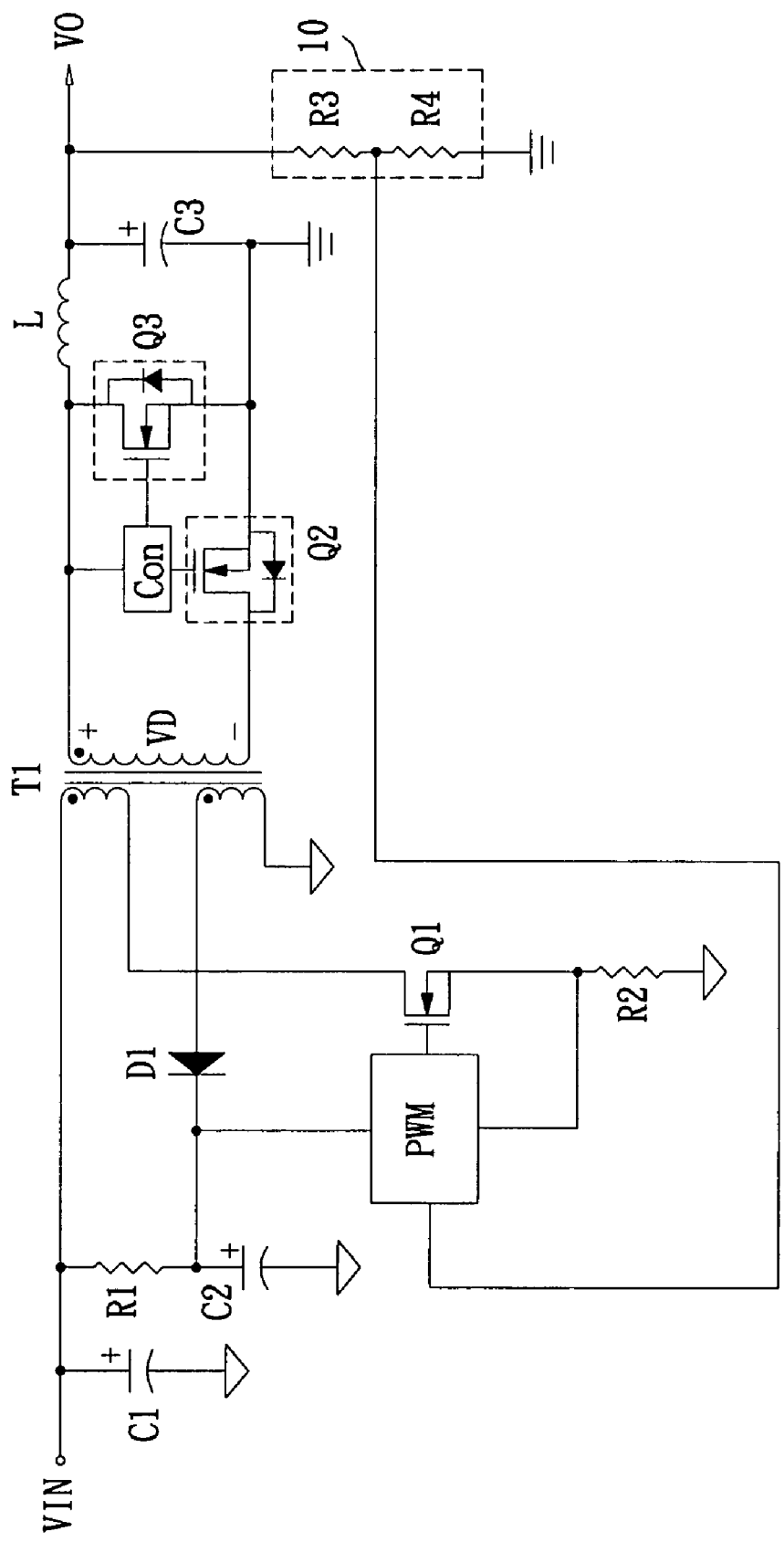
FIG. 2 shows a diagram of a conventional forward synchronous rectifier circuit.
Figure 3:
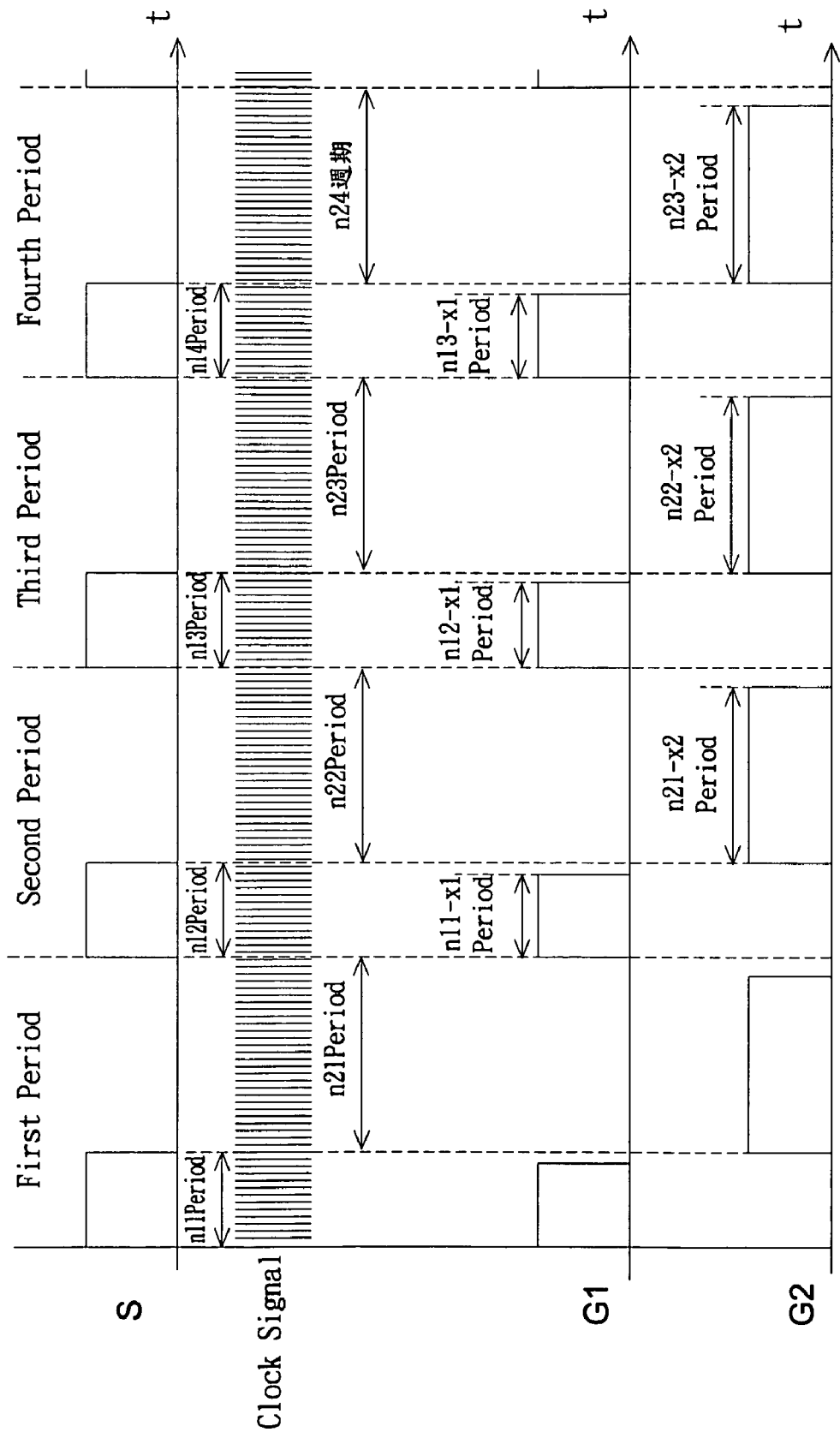
FIG. 3 shows a signal timing diagram of a conventional forward synchronous rectifier circuit.
Figure 4:
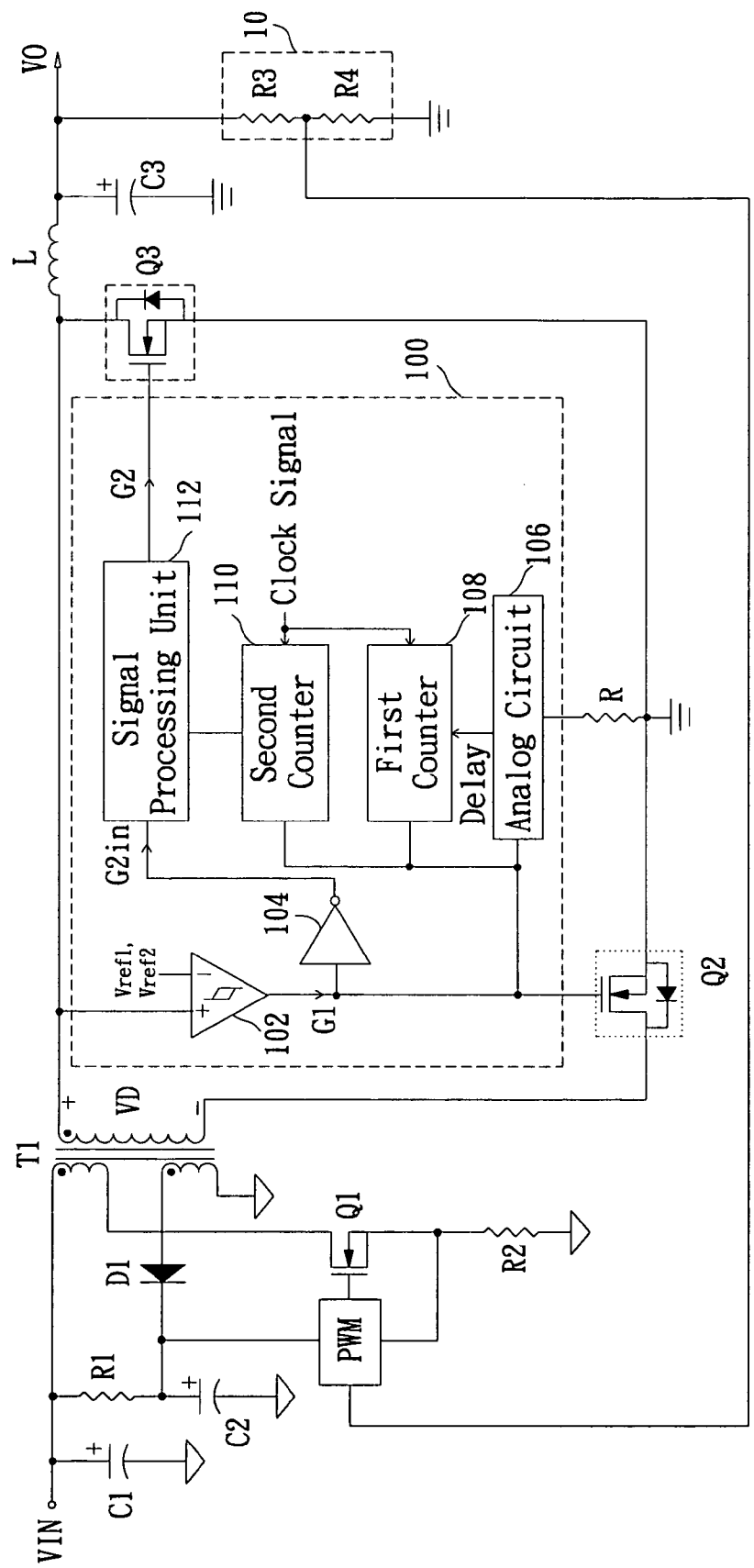
FIG. 4 shows a diagram of forward synchronous rectifier circuit according to a preferred embodiment of the present invention.

Refer to FIG. 4, wherein a diagram of forward synchronous rectifier circuit according to a preferred embodiment of the present invention is shown. The depicted forward synchronous rectifier circuit includes an input voltage VIN, a pulse width modulation controller PWM, an input filtering capacitor C1, an start-up resistor R1, an start-up capacitor C2, a current detecting resistor R2, a rectifier diode D1, transistor switches Q1, Q2 and Q3, a transformer T1, an energy storage inductor L, an output filtering capacitor C3, a voltage detector 10 and a synchronous rectifier control device 100, wherein input filtering capacitor C1, start-up resistor R1, start-up capacitor C2, rectifier diode D1, transformer T1, energy storage inductor L and output filtering capacitor C3 form a converting unit, and transistor switches Q2 and Q3 form a synchronous rectifier switch unit. Input voltage VIN is coupled with the primary side of transformer T1 for providing power. Input filtering capacitor C1 is coupled with input voltage VIN for filtering input noise. Start-up resistor R1 and start-up capacitor C2 are coupled in series with input voltage VIN. In start of the circuit, the potential across start-up capacitor C2 is sufficiently charged to start the operation of pulse width modulation controller PWM.

Voltage detector 10 consists of resistors R3, R4, coupled with the secondary side of transformer T1, so as to generate a voltage detecting signal based on the magnitude of output voltage VO. Pulse width modulation controller PWM adjusts the duty cycle of the generated control signal which is based on the voltage detecting signal as well as the output current detecting signal, and the output current detecting signal is generated by current detecting resistor R2, all in order to tune the ratio of conducting and cutoff time in transistor switch Q1. Transistor switch Q1 is coupled with the primary side of transformer T1, controlling the power level transformed by transformer T1 through the switching of conducting and cutoff condition. When transistor switch Q1 is conducting, input voltage VIN provides power via transformer T1, stores power to start-up capacitor C2 through rectifier diode D1. When transistor switch Q1 is cutoff, in start-up capacitor C2 releases power to provide pulse width modulation controller PWM to continue to operate.

Synchronous rectifier control device 100 is coupled with the secondary side of transformer T1, and detects a voltage VD on the secondary side of transformer T1, thereby output a synchronous rectifier signal to control the conductance and cutoff of transistor switches Q2 and Q3 on the secondary side, such that transformer T1 stores the transformed power onto energy storage inductor L and output filtering capacitor C3 to generate an output voltage VO.

Figure 5:
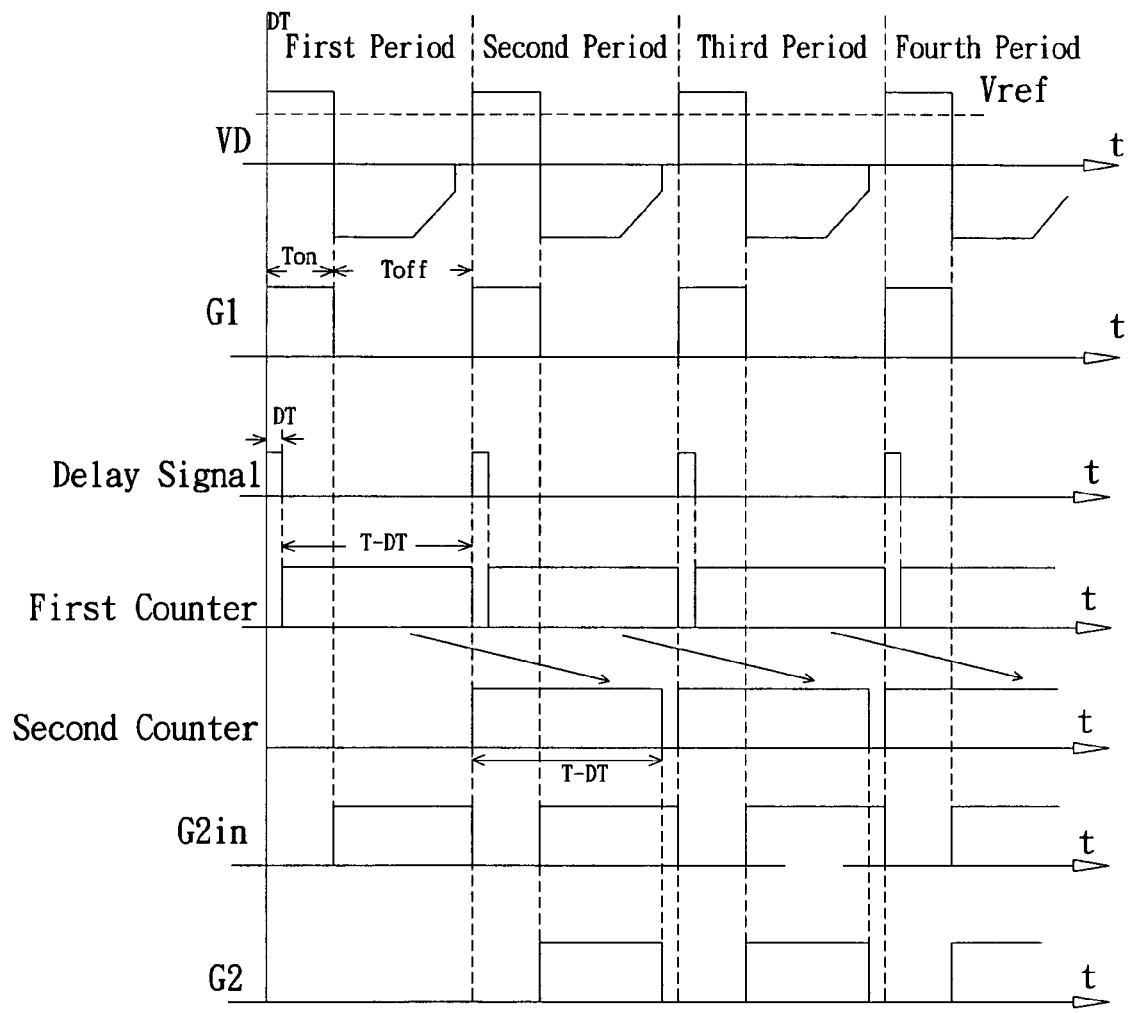
FIG. 5 shows a signal timing diagram of a forward synchronous rectifier circuit according to the present invention.

FIG. 5 shows a signal timing diagram of a forward synchronous rectifier circuit according to the present invention. In conjunction with FIGS. 4 and 5 for references, the synchronous rectifier control device 100 includes a status detecting unit 102, an inverter 104, an analog circuit 106, a first counter 108, a second counter 110 and a signal processing unit 112. Status detecting unit 102 compares the secondary side voltage VD with a first reference voltage VREF1 and a second reference voltage VREF2 to generate a first synchronous control signal G1. When secondary side voltage VD arises and exceeds first reference voltage VREF1, first synchronous control signal G1 is HIGH and maintains a time period of Ton for making transistor switch Q2 conducting. When secondary side voltage VD falls thus down below second reference voltage VREF2, first synchronous control signal G1 transits to LOW and maintains a time period of Toff for making transistor switch Q2 cutoff. Inverter 104 is coupled with status detecting unit 102, and generates an inverted signal G2in based on first synchronous control signal G1 as the reference signal for transistor switch Q3. Analog circuit 106 is coupled with the output of status detecting unit 102 to receive first synchronous control signal G1, and when the transition of first synchronous control signal G1 to HIGH is detected, it generates a delay signal DELAY according to the resistance value of resistor R, whose time period is DT. First counter 108 is coupled with inverter 104 and analog circuit 106, and is ready to count upon the said transition to HIGH on the first synchronous control signal G1 At this moment, the delay signal is also HIGH, holding the operation of first counter 108 until the delay signal turns to LOW. When the delay signal transits to LOW, first counter 108 starts to count based on a clock signal, until first synchronous control signal G1 changes again to HIGH, and sends the count data to a second counter 110. Second counter 110 is coupled with status detecting unit 102 and first counter 108, and counts down from the count data of first counter 108 that was received in the last period until zero, the output signal of logic HIGH transits to logic LOW. Signal processing unit 112 is couple with inverter 104 and second counter 110, and generates a second synchronous control signal G2 of logic HIGH when inverted signal G2in and the output signal of second counter 110 are both logic HIGH; whereas, when any received signal transits LOW, second synchronous control signal G2 changes to logic LOW. Transistor switch Q3 controls the conductance and cutoff based on second synchronous control signal G2.

Referring again to FIG. 5, wherein, during the first period of the synchronous rectifier control device 100 just starts, since first counter 108 has not yet sent any count data to second counter 110, second synchronous control signal G2 of the first period is not logic HIGH, and the power in energy storage inductor L is released through the body diode in transistor switch Q3. In the first period, first counter 108 counts until the count data equals time length (T−DT), and sends it to second counter 110. In the second period, second counter 110 counts down based on the said count data of first counter 108 in the first period, and generates HIGH signal of the same time length (T−DT), such that the time length of logic HIGH in second synchronous control signal G2 is also (T−DT). Therefore, it is possible to set deadtime period DT between transistor switch Q3 cutoff time and transistor switch Q2 conduction time. In the present embodiment, the deadtime period is not set between transistor switch Q2 cutoff and transistor switch Q3 conducting mainly because that, a time lag exists between the generation of first synchronous control signal G1 and second synchronous control signal G2 by synchronous rectifier control device 100, and the time lag can be hence used as the deadtime period. Certainly, the approach that the present invention uses analogy circuit to set a deadtime period may be also applied between transistor switch Q2 cutoff and the transistor switch Q3 conducting time, thus the aforementioned embodiment is merely illustrative without limiting the present invention thereto.

Figure 6:
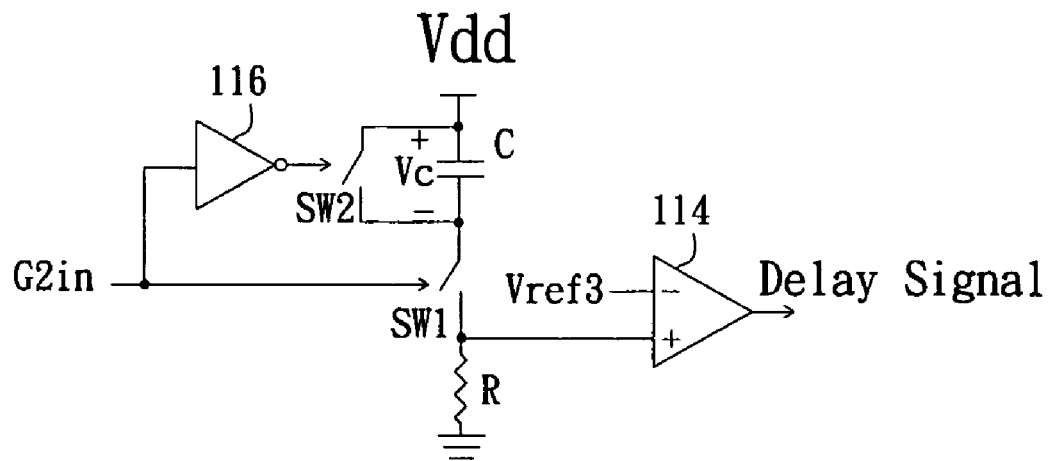
FIG. 6 shows a diagram of analog circuit according to a preferred embodiment of the present invention.

Referring now to FIG. 6, wherein a diagram of analog circuit according to a preferred embodiment of the present invention is shown. Analog circuit 106 comprises a voltage source Vdd, two switches SW1, SW2, a comparator 114, an inverter 116, a resistor R and a capacitor C. Switch SW1 switches based on inverted signal G2in, which is conducted at HIGH and cutoff at LOW. As soon as switch SW1 is conducted and switch SW2 is cutoff, it starts to charge capacitor C, such that the crossuvoltage thereon arises gradually, and the voltage of connection point of capacitor C and resistor R descends from Vdd, hence falling below a third reference voltage Vref3 after a predetermined period of time. The length of the predetermined period of time may be adjusted by way of adjusting the magnitude of resistor R, so as to match various types of forward synchronous rectifier circuit. Comparator 114 compares third reference voltage Vref3 with the connection point voltage of capacitor C and resistor R. When switch SW1 just starts to be conducted, the connection point voltage is higher than third reference voltage Vref, and comparator 114 outputs the delay signal of logic HIGH; as soon as the connection point voltage decreases to be lower than third reference voltage Vref, the delay signal transits to logic LOW. In the next period, when inverted signal G2in is LOW and is reversed by inverter 116 to logic HIGH, switch SW2 will be controlled to start conducting and would cause capacitor C to discharge, reducing capacitor voltage Vc to zero, and then repeating the above-mention procedure.

Figure 7:
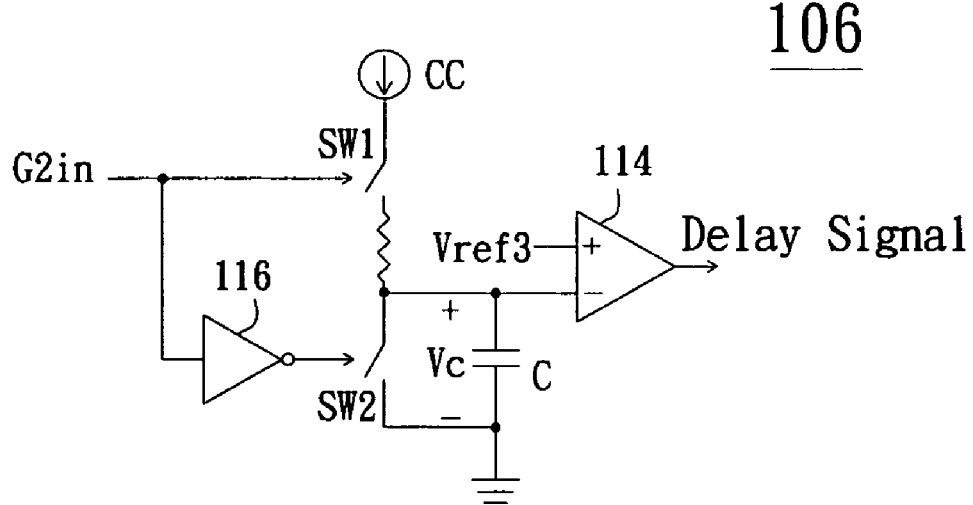
FIG. 7 shows a diagram of analog circuit according to another preferred embodiment of the present invention.

Referring to FIG. 7, wherein a diagram of analog circuit according to another preferred embodiment of the present invention is illustrated. Analog circuit 106 includes a current source CC, two switches SW1, SW2, a comparator 114, an inverter 116, a resistor R and a capacitor C. Switch SW1 switches based on inverted signal G2in, which is conducted at HIGH and cutoff at LOW. As soon as switch SW1 is conducted and switch SW2 is cutoff, it starts to charge capacitor C, such that the cross voltage Vc thereon arises gradually, and is higher than a third reference voltage. Vref3 after a predetermined period of time. The length of the predetermined period of time may be adjusted by way of adjusting the magnitude of capacitor C, so as to match various types of forward synchronous rectifier circuit. Comparator 114 compares third reference voltage Vref3 with capacitance voltage Vc. When capacitance voltage Vc is lower than third reference voltage Vref3, it outputs the delay signal of logic HIGH; as soon as capacitance voltage Vc becomes higher than third reference voltage Vref3, the delay signal transits to logic LOW. In the next period, when inverted signal G2in is LOW and is reversed by inverter 116 to logic HIGH, switch SW2 will be controlled to be conducted, causing capacitor C to discharge, reducing capacitance voltage Vc to zero, and then repeating the above-mention procedure.

In summary, as described supra, the present invention fully matches the three requirements for patent application: novelty, progression and usability in the art. Although the present invention has been disclosed with the preferred embodiments thereof, those skilled in the art should, however, appreciate that the illustrated embodiments are merely stated to describe the present invention, not to be construed as limiting the scope of the present invention thereto. It is noted that all changes, modifications and alternations equivalent in effect to the aforementioned embodiments should be considered as being encompassed within the scope of the present invention. Therefore, the scope of the present invention required to be protected should be defined and delineated by the claims set out hereunder.

What is claimed is:

1. A synchronous rectifier control device, coupled with a secondary side of a forward synchronous rectifier circuit, which includes:
   a status detecting unit, which receives a detecting signal representing the condition on the secondary side of the forward synchronous rectifier circuit, as well as at least one reference signal, in which a first synchronous control signal is generated accordingly;
   an analog circuit, which is coupled with the status detecting unit, and generates a delay signal based on the first synchronous control signal;
   a first counter, which is coupled with the status detecting unit and the analog circuit and receives a clock signal, and counts as well as generates a first counting signal according to the first synchronous control signal, the clock signal and the delay signal;
   a second counter, which is coupled with the first counter and the status detecting unit and receives the clock signal, the second counter generates a second counting signal according to the first synchronous control signal, the clock signal and the first counting signal; and a signal processing unit, which is coupled with the status detecting unit and the second counter, so as to generate a second synchronous control signal based on the first synchronous control signal and the second counting signal.

2. The synchronous rectifier control device according to claim 1, wherein the analog circuit is coupled with a resistor, and adjusts the time period of the delay signal based on the resistance value of the resistor.

3. The synchronous rectifier control device according to claim 1, wherein the analog circuit is coupled with a capacitor, and adjusts the time period of the delay signal based on the capacitance value of the capacitor.

4. The synchronous rectifier control device according to claim 2, wherein the delay signal is used to delay the counting operation in the first counter.

5. The synchronous rectifier control device according to claim 3, wherein the delay signal is used to delay the counting operation in the first counter.

6. The synchronous rectifier control device according to claim 1, wherein the transition time point in the second synchronous control signal occurs simultaneously with the earlier one of transition time points in the first synchronous control signal and the second counting signal.

7. A forward synchronous rectifier circuit, which includes:
a converting unit, which has a primary side and a secondary side, in which the primary side is coupled with an input voltage, converting the power of the input voltage into an output voltage onto the secondary side;
a first switch, which is coupled with the primary side of the converting unit;
a pulse width modulation controller controls the switching of the first switch based on a detecting signal of the output voltage;
a synchronous rectifier switch unit, which has a second switch and a third switch, coupled with the secondary side of the converting unit to rectify the output voltage; and
a synchronous rectifier control device, which couples with the secondary side of the converting unit with a synchronous rectifier control device, and generates a first synchronous control signal and a second synchronous control signal based on the status of the secondary side, so as to respectively control the switching of the second switch and the third switch; wherein the synchronous rectifier control device is coupled with a resistor or a capacitor, and, based on the capacitance value or resistance value thereof, sets a time lag between the first synchronous control signal and the second synchronous control signal.

8. The forward synchronous rectifier circuit according to claim 7, wherein the synchronous rectifier control device includes:
a status detecting unit, which receives a detecting signal representing the status on the secondary side of the forward synchronous rectifier circuit and at least one reference signal, in which a first synchronous control signal is generated accordingly;
an analog circuit, which is coupled with the status detecting unit as well as the resistor or the capacitor, and generates-a delay signal based on the first synchronous control signal as well as the capacitance value of the capacitor or the resistance value of the resistor;
a first counter, which is coupled with the status detecting unit and the analog circuit and receives a clock signal, and counts as well as generates a first counting signal according to the first synchronous control signal, the clock signal and the delay signal;
a second counter, which is coupled with the first counter and the status detecting unit and receives the clock signal, and counts according to the first synchronous control signal, the clock signal and the first counting signal as well as generates a second counting signal; and
a signal processing unit, which is coupled with the status detecting unit and the second counter, so as to generate a second synchronous control signal based on the first synchronous control signal and the second counting signal.

9. The forward synchronous rectifier circuit according to claim 8, wherein the delay signal is used to delay the counting operation in the first counter.

10. The forward synchronous rectifier circuit according to claim 8, wherein the transition time point in the second synchronous control signal occurs simultaneously with the earlier one of transition time points in the first synchronous control signal and the second counting signal.

* * * * *